(12) United States Patent
Koh

(10) Patent No.: US 6,757,783 B2
(45) Date of Patent: Jun. 29, 2004

(54) PORTABLE STORAGE MEDIUM BASED ON UNIVERSAL SERIAL BUS STANDARD AND UFI STANDARD

(75) Inventor: Young Sook Koh, Seoul (KR)

(73) Assignee: Daesung EC&P Co., Ltd., Seoul (KR)

( * ) Notice: Subject to any disclaimer, the term of this patent is extended or adjusted under 35 U.S.C. 154(b) by 280 days.

(21) Appl. No.: 09/996,219

(22) Filed: Nov. 28, 2001

(65) Prior Publication Data

US 2003/0167376 A1 Sep. 4, 2003

(30) Foreign Application Priority Data

Nov. 13, 2001 (KR) .......................................... 2001-70564

(51) Int. Cl.$^7$ ............................................. G06F 12/00
(52) U.S. Cl. ........................ 711/115; 711/159; 711/169; 710/105; 710/313
(58) Field of Search ................................ 711/103, 115, 711/137, 140, 107, 169, 133, 134, 141, 142, 143, 146, 154, 159; 710/105, 106, 313, 315

(56) References Cited

U.S. PATENT DOCUMENTS

| 5,937,427 | A | * | 8/1999 | Shinagawa et al. | .......... | 711/113 |
| 6,012,103 | A | | 1/2000 | Sartore | ............................ | 710/8 |
| 6,088,755 | A | | 7/2000 | Kobayashi et al. | .......... | 710/129 |
| 6,148,354 | A | | 11/2000 | Ban | ............................ | 710/102 |
| 6,275,911 | B1 | * | 8/2001 | Terada et al. | ................. | 711/154 |
| 6,401,163 | B1 | * | 6/2002 | Kondo et al. | ................. | 711/100 |
| 6,442,668 | B2 | * | 8/2002 | Sudo | ............................ | 711/211 |

FOREIGN PATENT DOCUMENTS

| KR | 10-2001-0020441 | 3/2001 |
| KR | 2001-0035042 | 5/2001 |
| KR | 2001-0036746 | 5/2001 |
| KR | 2001-0071332 | 7/2001 |
| KR | 2001-0095475 | 11/2001 |
| KR | 2002-0041221 | 6/2002 |

OTHER PUBLICATIONS

"Universal Serial Bus Mass Storage Class Specification Overview", © 1998 USB Implementers Forum, p. 1–8.*
"Universal Serial Bus Mass Storage Class UFI Command Specification", © 1998 USB Implementers Forum, p. 1–53.*

* cited by examiner

Primary Examiner—Donald Sparks
Assistant Examiner—Brian R. Peugh
(74) Attorney, Agent, or Firm—Lilling & Lilling P.C.

(57) ABSTRACT

There is provided a portable storage medium, based on USB standard, connected to a USB port of a host computer applying UFI protocol. The portable storage medium comprises a USB connector through which the storage medium is physically connected to the USB port of the host computer; at least one nonvolatile flash memory for storing data transmitted from the host computer; a program storage for storing a predetermined operation program based on USB and UFI; and a controller for controlling the entire operation of the storage medium based on the operation program stored in the program storage. The operation program of the program storage includes a memory processing block for checking and updating header block information of the flash memory, a device recognition processing block for transmitting device descriptor information and interface descriptor information for loading a UFI driver to the host computer, and a UFI processing block for generating predetermined UFI response packets by UFI commands sent from the host computer to transmit them to the host computer.

10 Claims, 10 Drawing Sheets

<PRIOR ART>

Fig. 6

INQUIRY RESPONSE PACKET

| OP CODE | DEVICE RECOGNITION INFORMATION | MANUFACTURER INFORMATION | PRODUCT INFORMATION | PRODUCT VERSION INFORMATION |
|---|---|---|---|---|

Fig. 7

MODE SENSE RESPONSE PACKET

| OP CODE | MEDIA TYPE INFORMATION | WRITE INHIBITION INFORMATION |
|---|---|---|

Fig. 8

READ CAPACITY RESPONSE PACKET

| OP CODE | INFORMATION ON TOTAL BLOCK SIZE | INFORMATION ON SINGLE BLOCK SIZE |
|---|---|---|

Fig. 9

READ FORMAT CAPACITY RESPONSE PACKET

| OP CODE | INFORMATION ON CURRENT BLOCK SIZE | FORMAT STATE INFORMATION |
|---|---|---|

Fig. 10

REQUEST SENSE RESPONSE PACKET

| OP CODE | ERROR CODE |
|---|---|

PORTABLE STORAGE MEDIUM BASED ON UNIVERSAL SERIAL BUS STANDARD AND UFI STANDARD

BACKGROUND OF THE INVENTION

1. Field of the Invention

The present invention generally relates to a portable storage medium using a flash memory and, more particularly, to a portable storage medium based on universal serial bus (USB) standard and a control method therefore, which can be simply recognized and driven by a host computer through USB and UFI (USB floppy interface), facilitates the extension of the flash memory capacity and ensures high speed of data writing.

2. Description of the Related Art

Conventional portable storage media, which supplement a fixed type storage medium such as a hard disk. Include a floppy disk, CD-ROM and zip drive disk, etc. However, a host computer using this portable storage medium must have an additional drive for the medium. The floppy disk is not widely used because of its small storage capacity. The CD-ROM of large capacity has a weakness that its surface is easily damaged.

Accordingly, a portable storage medium using a flash memory such as a flash drive having large storage capacity has been recently developed and being rapidly popularized. It is easily connected with the host computer and employs USB standard that guarantees high rate of data transmission. The USB standard is a computer port standard proposed by Intel, Microsoft and Compaq in order to develop plug and play. It does not require rebooting of the host computer when a peripheral device is connected to the host computer and ensures fast transmission rate, 12 Mb/s, for example.

Meantime, U.S. Pat. No. 6,148,354 entitled "Architecture for a universal serial bus-based PC flash disk", U.S. Pat. No. 6,012,103 entitled "Bus interface system and method", and Korea Patent No. 2001-35042 entitled "Portable storage medium using USB interface and flash memory" disclose the configuration of the USB-based portable storage medium and bus interfacing method.

FIG. 1 is a block diagram that roughly illustrates the configuration of the conventional USB-based portable storage medium. Reference numeral 10 represents a host computer having an operating system applying USB standard protocol, and 11 denotes a USB port through which a USB-based peripheral device is physically connected to the host computer. Reference numeral 12 designates a USB host controller for detecting a peripheral device being connected to the USB port 11 and controlling transmission and reception of data between the host computer 10 and the peripheral device based on the USB standard.

Reference numeral 13 denotes an inner storage medium of the host computer 10, such as hard disk, which has the operating system of the host computer 10 and a predetermined client driver. The client driver is provided by a USB flash drive manufacturer, which will be described below. A microprocessor (not shown) of the host computer 10 controls the entire operation of the host computer according to the operating system and the operation routine of the client driver.

The host computer 10 in FIG. 1 may be a computer device having the operating system installed the inner storage medium thereof, such as personal computer, servers and mobile communication terminal. The operating system is a general operating system such as Window 95, 98. ME, XP, MAC OS, including USB standard protocol.

The operating system recognizes the peripheral device connected to the host computer 10 to load a corresponding driver, assigns a USB bus address and system resource to the peripheral device, and operates the USB host controller 12 according to the USB standard. The client driver is loaded by the operating system to prepare a USB flash drive connected to the USB port 11, which will be described below, for operation. In addition, the client driver is compatible with firmware stored in the inner storage medium of the USB flash drive to execute various driving commands for operation of the USB flash drive.

Reference numeral 20 designates the USB flash drive containing a nonvolatile memory that is connected with the USB port 11 of the host computer 10 to store data transmitted from the host computer 10, and write, read and delete data through the host computer 10. Reference numeral 21 denotes a USB connector connected with the USB port 11 of the host computer 10 physically, and 22 represents a memory for storing data sent from the host computer 10, which includes at least one flash memory 221~22n that is a nonvolatile memory. The flash memory 221~22n has two kinds of NOR and NAND types. The USB flash drive 20 employs the cheap NAND type flash memory.

In FIG. 1, reference numeral 23 represents a decoder for decoding predetermined memory address information inputted from a processor that will be described below to output a chip select signal for selectively driving the flash memory 221~22n. Reference numeral denotes a program storage in which a USB flash drive driving program, that is, firmware, is stored, and 25 is the processor for controlling the entire operation of the USB flash drive 20 according to the driving program of the program storage 24.

Hereinafter, the operation of the conventional USB-based portable storage medium constructed as above will be explained.

First of all, when the USB flash drive 20 is connected to the USB port 11 of the host computer 10 to be provided with operation power, the processor 25 in FIG. 1 initializes the flash memory of 221~22n of the memory 22 according to the operation program of the program storage 24. In addition, the processor 25 transmits predetermined device descriptor information including a manufacturer ID and product ID to the host computer 10 at the host computer's request for device identification information to inform the host computer of initialization of the operation of the USB flash drive 20. The device descriptor information is basic information based on the USB standard, by which the host computer 10 recognizes the USB flash drive 20.

The host computer 10 receives the device descriptor information through the USB host controller 12, and then inquires peripheral device driver information contained in the operating system to confirm if a driver corresponding to the manufacturer ID and product ID is registered. Here, when the driver of the USB flash drive 20 is confirmed as registered, the host computer 10 loads the client driver according to the operation routine of the operating system and, simultaneously, allocates a USB bus address and system resource to the USB flash drive 20 to prepare its operation.

When it is determined that the driver of the USB flash drive 20 is not registered, on the other hand, the host computer 10 displays a request for installation of the client driver through a monitor (not shown). If a user installs the client driver provided by the manufacturer, the host computer 10 assigns the USB bus address and system resource to the USB flash drive 20 to prepare its operation. Then, the user operates the host computer 10 to store data in the USB flash drive 20, read or delete data from the host computer, or copy data into the host computer 10. At this time, the operating system of the host computer 10 and the operation program of the client driver and USB flash drive 20 work with each other to provide operation routines of data writing/reading/deletion operations of the flash memory 221~22n.

With the conventional USB flash drive 20, the client driver of corresponding manufacturer should be installed in the host computer 10 for the initial operation thereof. In case where a user uses a plurality of host computers, the client driver should be installed in each of them in terms of the characteristic of the portable storage medium.

Furthermore, with the NAND flash memory 221~22n used in the USB flash drive 20, data is read or written in pages of the flash memory when it performs "write" or "read" instruction. In addition, before data is written in an arbitrary page, it is required that the entire page of the block including the corresponding page is deleted and then the data is written.

In case where data is written in N pages ranging from block 0 to block 3, represented in black, as shown in FIG. 2, the data is written in the pages of the blocks 1 and 2 after deletion of that blocks because the data can be written on previous data stored therein. In case of the blocks 0 and 3, however, pages P1 required to be preserved exist therein. Accordingly, as shown in FIG. 3, all pages in the original block are copied into a predetermined temporary area block before the deletion of previous data (ST301), and then all of the pages in the original block are deleted (ST302). Subsequently, pages required to be preserved, stored in the temporary area, are restored to a corresponding memory address of the original block (ST303), and data required to be written is written in pages (ST304). This procedure (ST301~ST304) is repeated by the number of pages of the blocks 0 and 3 where the data is written (ST305). Thus, data writing speed becomes considerably slow in case of the conventional NAND type flash memory 221~22n.

Moreover, FAT (File Allocation Table) of the flash memory may be damaged due to erroneous operation of the USB flash drive 20 or host computer 10 when the flash memory executes data "write" or "read" operation. In this case, the user should reformat the damaged FAT using a cure program (scan disk of Windows, for instance) of the host computer 10 or a predetermined cure program provided by the manufacturer. However, the user cannot appropriately cope with this situation if he is not experienced in handling the program.

Furthermore, in the conventional USB flash drive 20, the decoder 23 outputting the chip select signal to the flash memory 221~22n is fixed thereto as hardware so that the flash memory cannot be easily added and production cost increases.

SUMMARY OF THE INVENTION

An object of the present invention is to provide a portable storage medium based on USB standard and a control method therefor, which can be simply recognized and driven by a host computer through USB and UFI without having an additional client driver, facilitates the extension of the flash memory capacity and ensures high speed of data writing.

To accomplish a first aspect of the present invention, there is provided a portable storage medium, based on USB standard, connected to a USB port of a host computer applying UFI protocol, comprising: a USB connector through which the storage medium is physically connected to the USB port of the host computer; at least one nonvolatile flash memory for storing data transmitted from the host computer; a program storage for storing a predetermined operation program based on USB and UFI; and a controller for controlling the entire operation of the storage medium based on the operation program stored in the program storage, wherein the operation program of the program storage includes a memory processing block for checking and updating header block information of the flash memory, a device recognition processing block for transmitting device descriptor information and interface descriptor information for loading a UFI driver to the host computer, and a UFI processing block for generating predetermined UFI response packets by UFI commands sent from the host computer to transmit them to the host computer.

The flash memory is a NAND type flash memory, and the storage medium includes a USB controller for transmitting and receiving data to and from the host computer based on USB standard, an SMC controller for controlling the operation of the flash memory using an SMC interface signal, and a microprocessor connected to the USB controller and SMC controller to control the operation of the USB controller and SMC controller based on the operation program of the program storage and a UFI command transmitted from the host computer.

The portable storage medium further includes a toggle switch for operating a low-level-formatting operation when FAT information of the flash memory is damaged, wherein the program storage further includes a format processing block for deleting a block 0 of the flash memory when the number of times of switching operations of the toggle switch exceeds a predetermined number of times.

The SMC controller is connected to the flash memory through a data/address bus to transmit data read or written and address information of the data, the program storage includes a memory driving block for selectively driving the flash memory based on memory address information contained in "write" and "read" commands transmitted from the host computer, and the microprocessor is connected to the flash memory through a system bus to apply a chip select signal for driving the flash memory according to the operation routine of the memory driving block.

To accomplish a second aspect of the invention, there is provided a method for controlling the recognition of a portable storage medium which is connected to a USB port of a host computer applying UFI protocol and USB standard, the method comprising the steps of: transmitting device descriptor information, containing a manufacturer ID, a product ID and a first class information for selecting a UFI method, to the host computer in response to the request of the device descriptor of the host computer; transmitting interface descriptor information, containing a second class information for selecting UFI protocol, to the host computer in response to the request of the interface descriptor of the host computer; loading a UFI driver of the host computer according to the selected UFI protocol; transmitting a UFI response packet, including predetermined device information and capacity information, to the host computer in response to the request of identifying device and capacity of the host computers; and sending FAT information stored in a flash memory to the host computer in response to the request of FAT information of the host computer.

To accomplish a third aspect of the present invention, there is provided a method for controlling data writing operation of a portable storage medium adapting USB standard, comprising: a first step of confirming if a "write" command is transmitted from a host computer to which the storage medium is connected; a second step of confirming if the transmitted "write" command is the first "write" command; a third step of confirming if the memory address of the current "write" command follows the memory address of the previous "write" command, when the transmitted "write" command is not the first "write" command; and a fourth step of writing a new page, after the previous page, when the memory address of the previous "write" command follows the memory address of the current "write" command, the first to fourth steps being performed in a memory block where pages into which data will be written and pages into which data was written exist concurrently.

BRIEF DESCRIPTION OF THE DRAWINGS

Further objects and advantages of the invention can be more fully understood from the following detailed description taken in conjunction with the accompanying drawings, in which:

FIGS. 6 to 10 illustrate data configurations showing packet structures of UFI response packets;

DETAILED DESCRIPTION OF THE PREFERRED EMBODIMENT

The present invention will now be described in connection with preferred embodiments with reference to the accompanying drawings.

Figure 4:
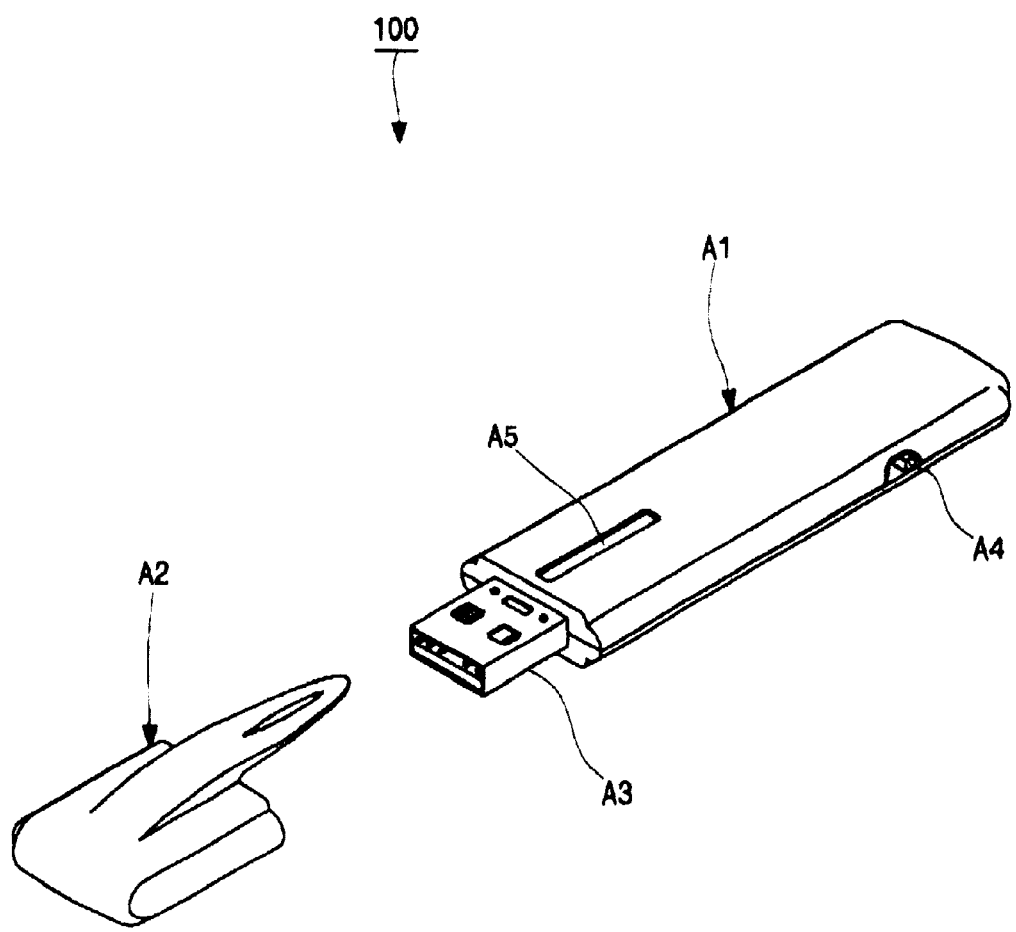
FIG. 4 is a perspective view illustrating the appearances of an USB-based flash drive according to an embodiment of the present invention.

FIG. 4 shows the appearances of a USB-based portable storage medium 100 (referred to as "USB flash drive" hereinafter) according to an embodiment of the invention. This USB flash drive includes an USB connector A3 physically connected to the USB port of a host computer, a toggle switch A4 for selecting a write inhibiting function and a low level format function that will be described below, a drive body A1 having an LED A5 for visually indicating the operating state of the drive, and a protection cap A2 for protecting the USB connector A3 of the drive body A1 from impurities or external shock when the drive is not being used. That is, a user simply connects the USB flash drive 100 shown in FIG. 4 to the host computer having the USB port to use it.

The USB flash drive 100 of the invention employs UFI (USB Floppy interface) protocol as an USB interface. The UFI protocol can recognize and drive a USB-based peripheral device connected to the host computer without having an additional client driver. The present invention applies this UFI protocol to the USB flash drive 100.

To apply the UFI protocol to the USB flash drive 100, the USB flash drive must include an additional firmware installed therein. In addition, the operating system of the host computer should be the Windows ME or XP version, for example, which have UFI driver applying the UFI protocol.

Figure 1:
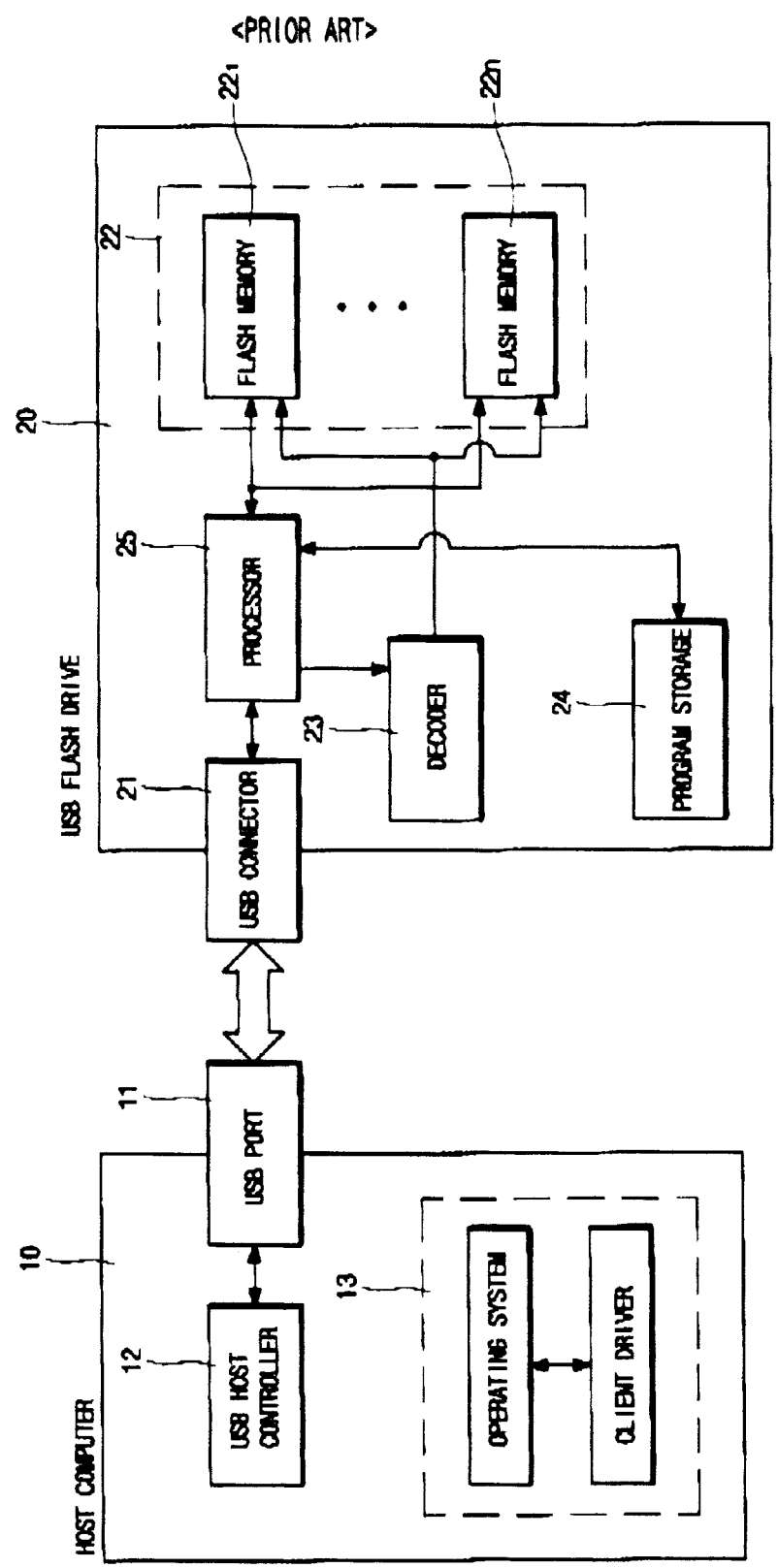
FIG. 1 is a block diagram roughly illustrating the configuration of a conventional USB-based portable storage medium.
Figure 2:
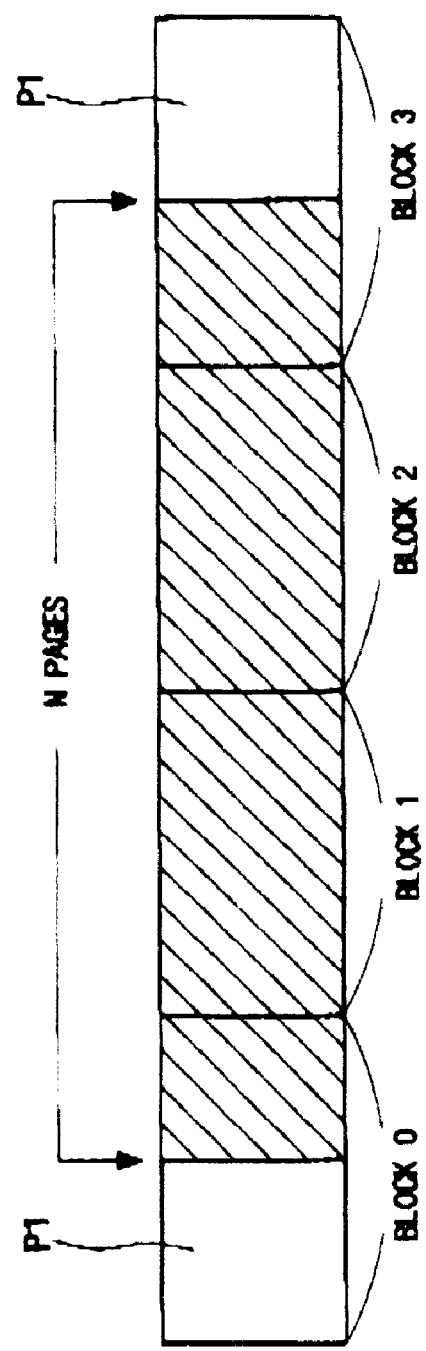
FIGS. 2 and 3 illustrate the data writing method of a conventional NAND type flash memory.
Figure 5:
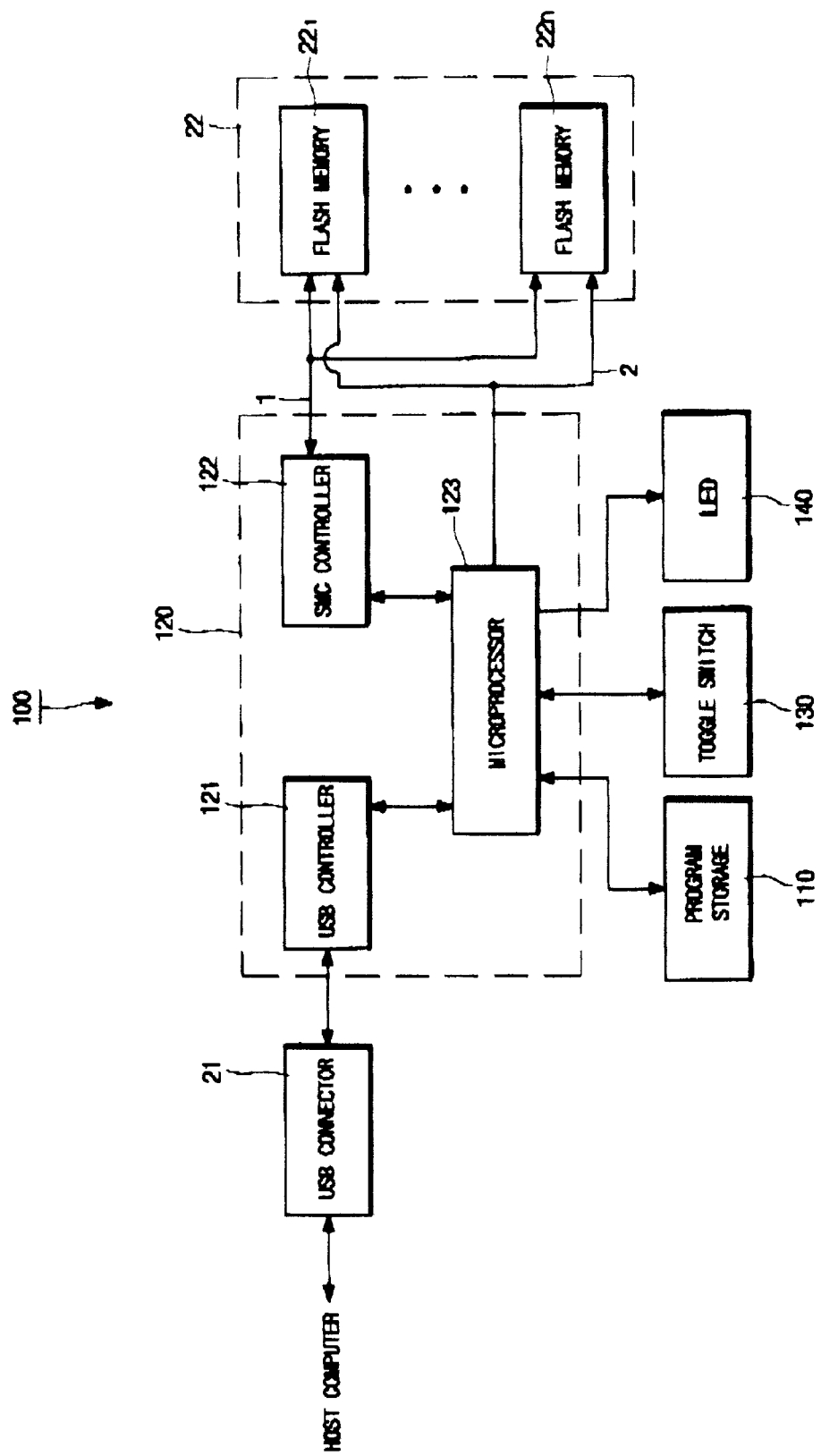
FIG. 5 is a block diagram illustrating the inner configuration of the USB-based flash drive according to an embodiment of the present invention.

Hereinafter, the USB flash drive 100 adapting the UFI protocol in accordance with the present invention will be described in detail. FIG. 5 is a block diagram showing the inner configuration of the USB flash drive 100 according to an embodiment of the invention. Like numerals designate like components in FIGS. 1 and 5 and detailed explanations for them are omitted. The host computer to which the USB flash drive 100 according to the invention is connected is constructed in a manner that the UFI protocol is applied to the host computer 10 of FIG. 1 so that the same reference numeral as that of the host computer in FIG. 1 is attached to the host computer of the invention for convenience of explanation.

In FIG. 5, reference numeral 110 is a program storage having an operation program constructed of a memory processing block, a device recognition processing block and a UFI processing block. The memory processing block checks and updates header block information of at least one flash memory 221~22n, and the device recognition processing block transmits device descriptor information and interface descriptor information for loading a UFI driver to the host computer 10. The UFI processing block generates predetermined UFI response packets by UFI commands sent from the host computer 10 to transmit them to the host computer 10.

The UFI commands use the mass storage class among USB classes and include various drive commands for driving peripheral devices using the USB standard. Through the drive commands, the USB flash drive 100 transmits identification information and capacity information thereof to the host computer 10 and executes data "reading" and "writing" operations. The UFI commands and UFI response packets will be explained below in detail.

Figure 3:
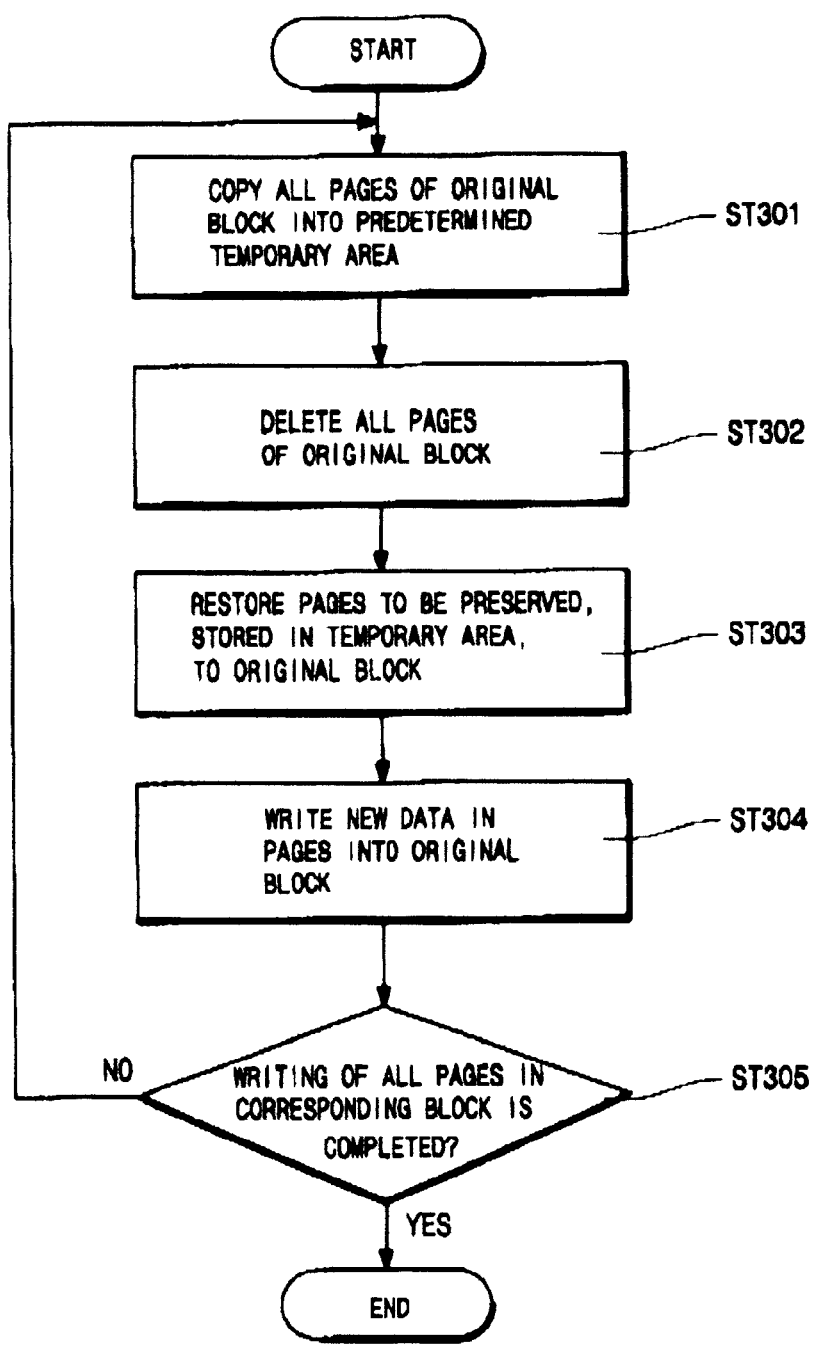

In addition, the program storage 110 includes a write processing block which is, when at least two "write" commands are continuously transmitted from the host computer 10 for the same memory block, programmed to directly write data, omitting the data preservation step described in FIG. 3, for the "write" commands for that memory block following the previous two instructions. This write processing block is for improving the speed of writing data into the flash memory 221~22n and it can be selectively included in the program storage.

Furthermore, the program storage 110 has a format processing block programmed to inhibit data from being written into the flash memory 221~22n or to low-level-format the flash memory based on the number of times of switching the toggle switch 130 (A4 in FIG. 4). This format processing block is for preserving the data stored in the flash memory 221~22n and hardwared—curing a damage that may be generated in FAT information of the flash memory. This can be selectively included in the program storage.

Reference numeral 120 designates a controller controlling the operation of the USB flash drive 100 according to the operation program of the program storage 110. The controller 120 includes a USB controller 121, an SMC controller 122 and a microprocessor 123, as shown in FIG. 5. The USB controller 121 transmits and receives data to and from the host computer 10 according to the USB standard and is constructed in accordance with USB Spec Rev 1.1. Detailed explanation for the USB Spec Rev 1.1 will be omitted since it is, well known to those skilled in the art.

The SMC controller 122 controls the operation of the NAND type flash memory 221~22n using an SMC (Smart Media Card) interface signal. The SMC controller 122 controls the data "reading" and "writing" operations of the flash memory on the basis of a control signal from the microprocessor 123. As shown in FIG. 5, the SMC controller 122 is connected to the flash memory through a data/address bus 1. Through this data/address bus, data read or written and its address information are transmitted.

The microprocessor 123 is connected to each flash memory 221~22n through a system bus 2 to apply a chip select signal for driving the memory. The system bus 2 is not connected to the SMC controller 122 but directly connected to the microprocessor 123 in order to easily increase the number of the flash memories 221~22n connected. Accordingly, the program storage 110 includes the memory driving block for selectively driving the flash memories 221~22n on the basis of memory address information contained in the "write" and "read" commands transmitted from the host computer 10.

The microprocessor 123 is connected to the program storage 110, USB controller 121 and SMC controller 122 to control the operations of the USB controller 121 and SMC controller 122 based on the operation program of the program storage 110 and a UFI command sent from the host computer 10. In addition, the microprocessor 123 decodes the UFI command transmitted from the host computer 10 to generate a predetermined UFI response packet, when the command requires a response, to send the generated packet to the host computer 10.

The following table 1 represents principal UFI commands sent from the host computer 10 to the USE flash drive 100, and FIGS. 6 to 10 show main UFI response packets transmitted from the USB flash drive 100 to the host computer 10 based on the UFI commands requiring responses among the UFI commands of the table 1.

TABLE 1

| UFI commands | Contents | OP Code |
|---|---|---|
| Inquiry | Require information about the manufacturer, product and version of a device | 12h |
| Mode sense | Require information about the media type and write inhibition | 5Ah |
| Prevent/Allow medium Removal | Prevent/allow medium removal | 1Eh |
| Read(10) | Require reading of a memory block | 28h |
| Read capacity | Require media capacity information | 25h |
| Read format capacity | Require information about media capacity and format state | 23h |
| Request sense | Require error information generated when a UFI command is executed | 03h |
| Test unit ready | Confirm preparation of operation of the device | 00h |
| Verify | Verify data stored in media | 2Fh |
| Write(10) | Require writing of a memory block | 2Ah |

In table 1, the "device" means the USB flash drive 100, and "media" means the flash memories 221~22n.

Reference numeral 130 in FIG. 5 represents the toggle switch for inhibiting data from being written into the flash memory 221~22n or key-operating the low-level-formatting of the flash memory when FAT information of the flash memory is damaged. The microprocessor 123 converts the flash memory into the write inhibition state when the operation signal of the toggle switch 130 (A4 in FIG. 4) is sensed once. If the operation signal of the toggle switch 130 is sensed continuously at least four times, the microprocessor forcibly deletes the memory block storing the FAT information of the flash memory 221~22n to low-level-format the flash memory.

Reference numeral 140 designates an LED for visually displaying the operation state of the USB flash drive 100. The microprocessor 123 turns on the LED 140 (A5 in FIG. 4) in the event of the "read" and "write" operations of the flash memories 221~22n.

There will be explained below the USB and USB based interface connection structure between the host computer 10 and USB flash drive 100 and the program hierarchy structure with reference to FIG. 11.

Figure 11:
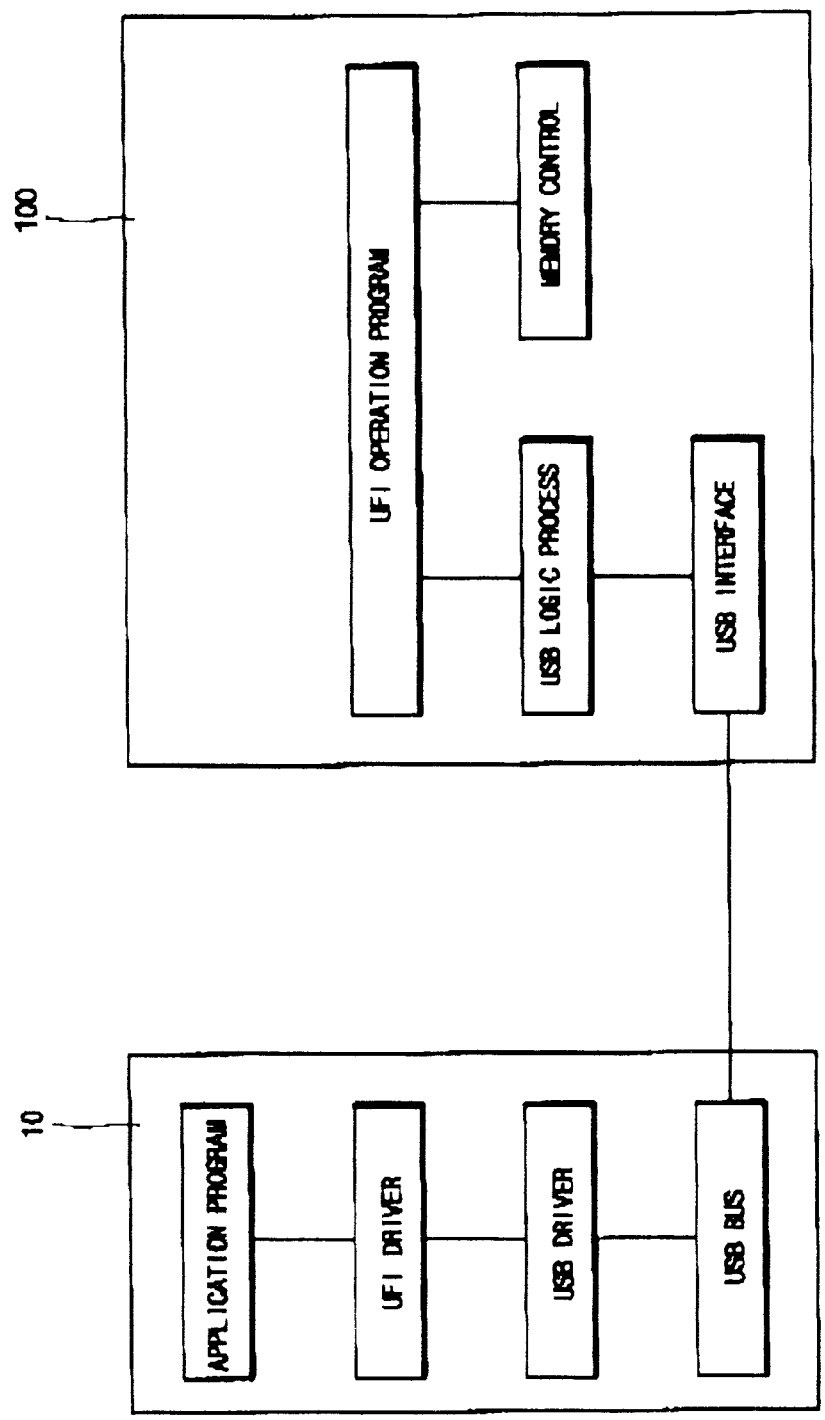
FIG. 11 is a conceptional view for explaining the interface connection structure between a host computer and USB flash drive and a program hierarchical structure according to an embodiment of the present invention.

As shown in FIG. 11, the host computer 10 has the descending hierarchy structure constructed of an application program, UFI driver, USB driver and USB bus, and the USB flash drive 100 has the hierarchy structure of a UFI operation program, USB logic process, memory control and USB interface.

Specifically, when the USB bus of the host computer 10 and the USB interface of the USB flash drive are physically connected to each other, the USB flash drive 100 initializes the flash memory 221~22n through the USB logic process, and the host computer 10 receives device descriptor information for recognition of the USB flash drive 100 according to the operation routine of the USB driver. Then, the host computer 10 loads the UFI driver based on the device descriptor information to allow the application program such as the file manager of Microsoft Co. to recognize the USB flash drive 100. The USB flash drive 100 decodes a UFI command transmitted from the host computer 10 according to the UFI operation program (UFI processing block) of the firmware to control the operations of the flash memory 221~22n.

A method of operating and controlling the USB flash drive 100 according to an embodiment of the invention is described below with reference to FIGS. 12, 13 and 14.

Figure 12:
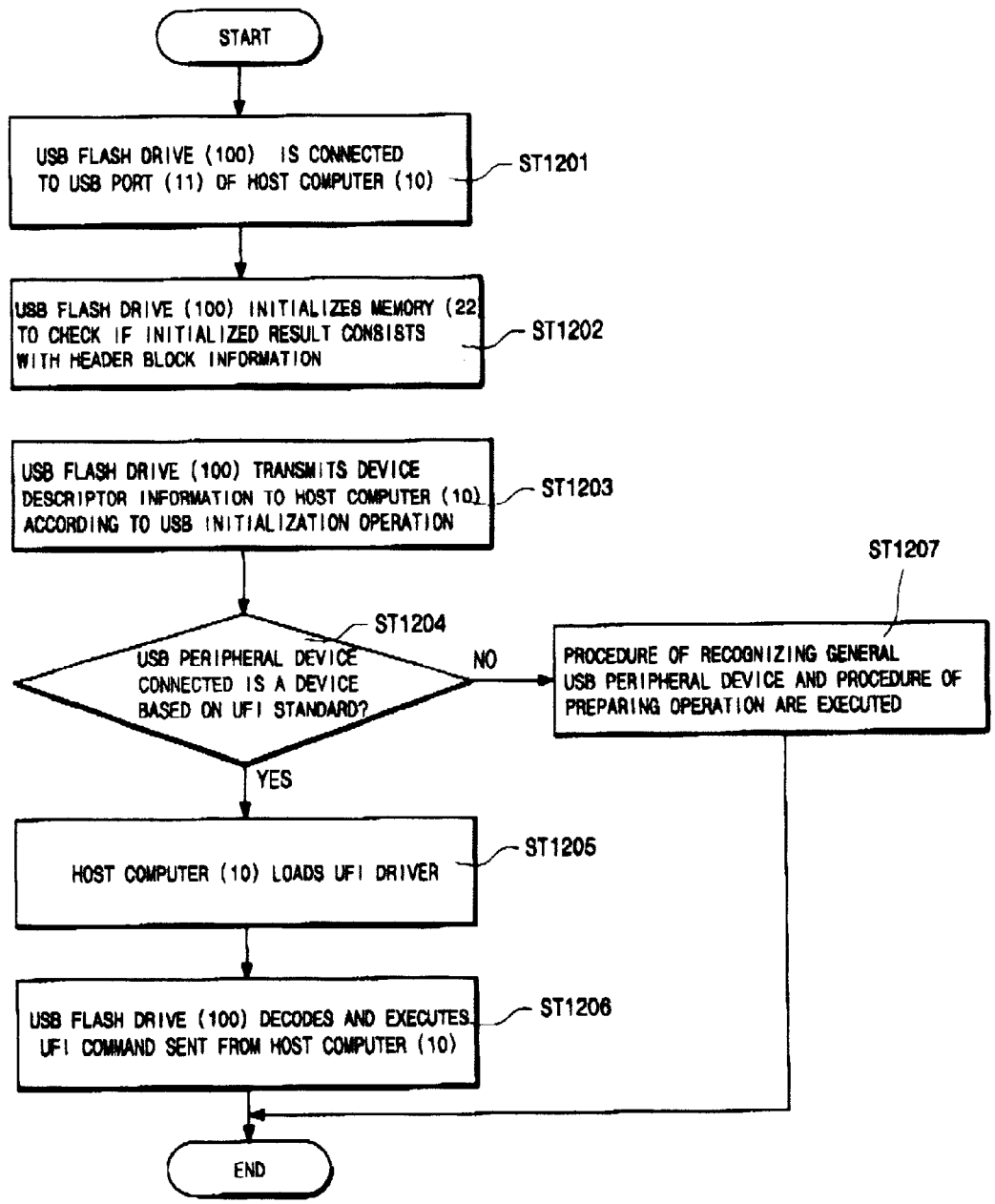
FIGS. 12, 13 and 14 are flow diagrams for explaining a method of operating and controlling the USB flash drive according to an embodiment of the present invention.

FIG. 12 is a flow chart for explaining the operation procedure of the USB flash drive 100 according to an embodiment of the invention. First of all, when the USB flash drive 100 of FIG. 5 is connected to the USB port 11 of the host computer 10, the operation power applied from the host computer 10 is provided to a regulator (not shown) in the USB flash drive via the USB connector 21 (A3 in FIG. 4). The regulator supplies operation power, 3.3V, for example, to the flash memory 221~22n, program storage 110 and controller 120 (ST1201).

Then, the controller 110 of the USB flash drive 100 initializes the memory 22 and checks if the initialized result is consist with header block information stored in the flash memory 221~22n. The header block information is constructed of the total capacity of the flash memories and bad block information, and located in the first memory block of the first flash memory. If the initialized result is not consist with the header block information, the controller 110 updates the header block information based on the initialized result (ST1202).

Subsequently, the controller 110 of the USB flash drive 100 performs the USB initialization operation of transmitting the device descriptor information of the USB flash drive to the host computer 10. All of USB peripheral devices are given their manufacturer IDs and product IDs, and the device descriptor information includes the manufacturer ID and product ID of the USB flash drive 100 and various class information indicating the kind of the USB peripheral device (ST1203).

The host computer 10 confirms the received device descriptor information to verify if the USB peripheral device connected thereto is a UFI peripheral device. Here, when the class information of the device descriptor information has the code value 00h, for example, it means the peripheral device uses the UFI protocol. Class information having other code values means a peripheral device requiring a client program (ST1204).

When the host computer 10 confirms that the USB flash drive 100 is a device based on the UFI standard, the host computer checks the kind of the USB flash drive 100 to load a corresponding UFI driver and allocates USB bus address and system resource of the USB flash drive 100 to prepare the operation of the USB flash drive (ST1205). Then, the USB flash drive 100 decodes and executes a UFI command in the table 1, sent from the host computer 10, and, when the UFI command requires response information, forms a corresponding UFI response packet as shown in FIGS. 6 to 10 to transmit it to the host computer 10 (ST 1206).

In case where it is confirmed that the class information of the device descriptor information has a code value other than 00h in the step ST1204, the host computer 10 and its USB peripheral device pass through a general procedure of recognizing the USB peripheral device and preparing the operation thereof (ST1207).

The UFI response packet structures of FIGS. 6 to 10 are roughly explained below. OP codes in FIGS. 6 to 10 have the same values as the OP codes values of corresponding UFI commands of the table 1.

The inquiry response packet of FIG. 6 is the response to the inquiry command of the table 1 and it includes an OP code, device recognition information, manufacturer information, product information and product version information. The device recognition information has the same code value as the device descriptor information.

The mode sense response packet of FIG. 7 is the response to the mode sense command of the table 1 and it includes an OP code, media type information and write inhibition information. The media type information indicates the kinds of the memories based on the capacities of the flash memories 221~22n.

The read capacity response racket of FIG. 8 is the response to the read capacity command of the table 1 and it includes an OP code, information on the size of the entire block and information about the size of one block. The read capacity response packet indicates the total memory capacity of the flash memories 221~22n.

The read format capacity response packet of FIG. 9 is the response to the read format capacity of the table 1 and it includes an OP code, information on the current block size and information on the format state. It represents the current memory capacity of the flash memories and indicates if the flash memories are formatted or not.

The request sense response packet of FIG. 10 is the response to the read sense command in the table 1 and it includes an OP code and an error code. This request sense response packet informs the host computer 10 of various abnormal operation states of the USB flash drive 100.

The most important commands among the UFI commands in the table 1 are "read" command Read(10) and "write" command Write(10). The read command includes the start address of a memory block from which data is read and information about the block size, and the write command contains the start address of a memory block into which data is written and information about the block size. These commands do not require response packets.

Figure 13:
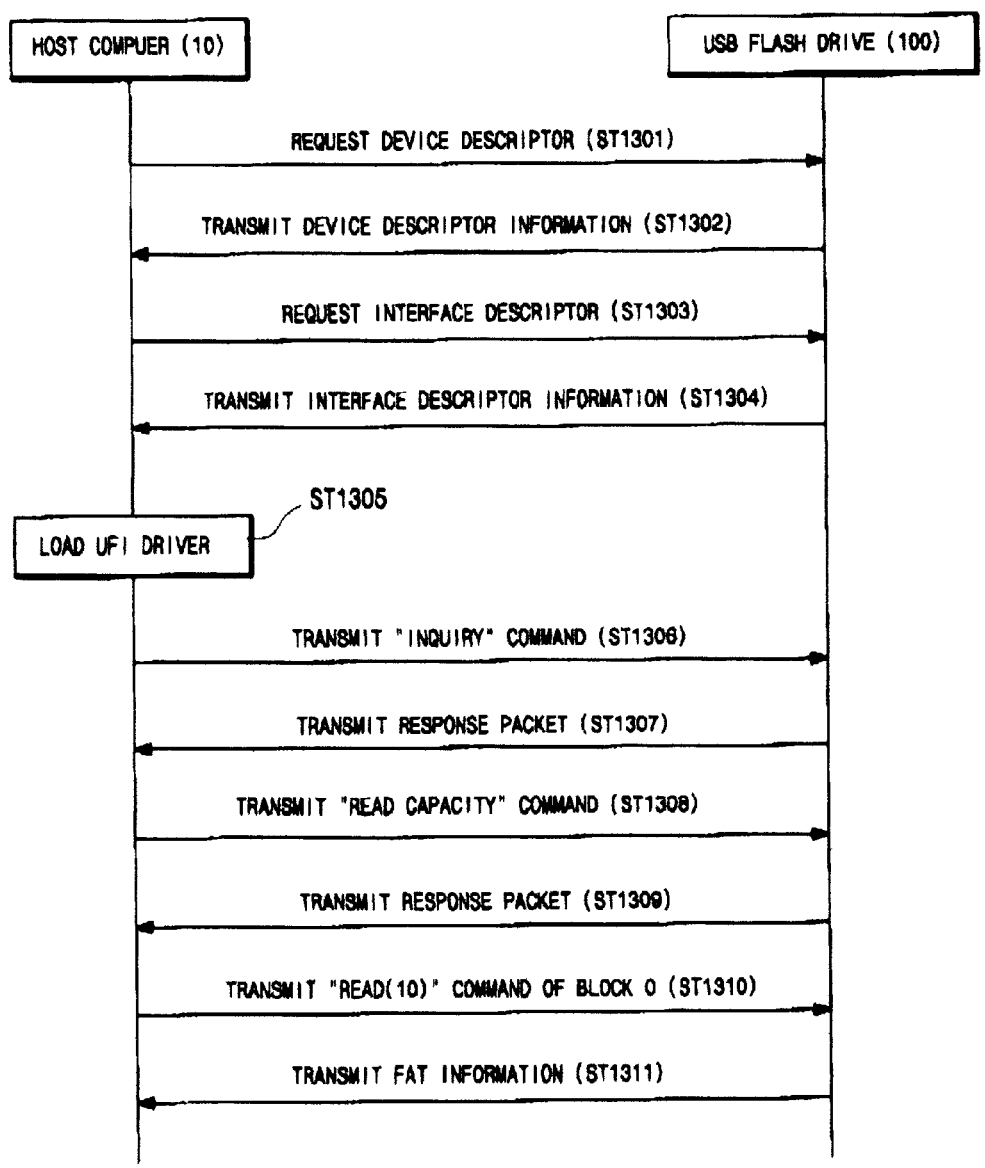

FIG. 13 is a flow chart for explaining the procedure of recognizing the USB flash drive 100 and preparing the operation thereof according to an embodiment of the present invention, illustrating the steps ST1203, ST1204 and ST1205 in FIG. 12 in more detail.

The host computer 10 needs the descriptors shown in the following table 2 in order to recognize the USB peripheral device.

TABLE 2

| Classification | Contents |
| --- | --- |
| Device descriptor information | Confirm if the manufacturer ID and product ID of a device and UFI protocol are used |
| Configuration descriptor information | Set an environment required for the operation of the device |
| Interface descriptor information | Determine a protocol used by the device (decide a UFI driver) |
| Endpoint descriptor information | Determine the endpoint used by the device |
| Sting descriptor information | Transmit the serial number of the device to a string |

The device descriptor information and interface descriptor information in the table 2 are principal protocols related with the recognition of the peripheral device by the host computer 10.

Specifically, when the host computer 10 requests the USB flash drive 100 to send the device descriptor thereof (ST1301), the USB flash drive 100 transmits its device descriptor information constructed of device class information, device sub-class information, manufacturer ID and product ID to the host computer 10. Here, both of the device class information and device sub-class information have the code value 00h for using the UFI protocol. Definition of code values is based on the USB standard and UFI protocol (ST1302).

The host computer 10 that has received the device descriptor information requests the USB flash drive 100 to send the interface descriptor for loading the UFI driver of the USB peripheral device (ST1303). In response to this request, the USB flash drive 100 transmits the interface descriptor information constructed of interface class information having the code value 08h and interface sub-class information having the code value 04h, for example, to the host computer 10. 08h and 04h are code values that are used when the USB peripheral device is employed as a storage medium (ST1304).

The host computer 10 that has received the interface descriptor information loads the UFI driver for driving the USB flash drive 100 to the operating system based on the received interface descriptor information (ST1305). In addition, the host computer transmits the inquiry command of the table 1 to the USB flash drive 100 in order to confirm the device information of the USB flash drive 100 connected through UFI method (ST1306). Then, the USB flash drive 100 generates the inquiry response packet of FIG. 6 to send it to the host computer 10 (ST1307).

Furthermore, the host computer 10 transmits the read capacity command and read format capacity command of the table 1 to the UST flash drive 100 in order to confirm the memory capacity of the flash memory 221~22n and checks if it is formatted (ST1308). Then, the USB flash drive 100 generates the read capacity response packet of FIG. 8 and the read format capacity response packet of FIG. 9 to send them to the host computer 10 (ST1309).

The host computer 10 that confirmed the device information of the USB flash drive 100, capacity information and format information through the aforementioned steps transmits the read(10) command of the block 0 to the USB flash drive 100 in order to receive the FAT information of the flash memory 221~22n (ST1310). Then, the USB flash drive 100 read the FAT information stored in the block 0 of the flash memory 221~22n to send it to the host computer 10. The host computer 10 recognizes the USB flash drive 100 from the application program layer of FIG. 11 to display the drive icon of the USB flash drive 100 and memory capacity information through the file manage of Windows, for example, and represents the list of data files stored (ST1311).

According to the above-described procedure, therefore, the USB flash drive 100 connected to the host computer 10 can be easily recognized and prepared to be operated without installing an additional client driver.

Figure 14:
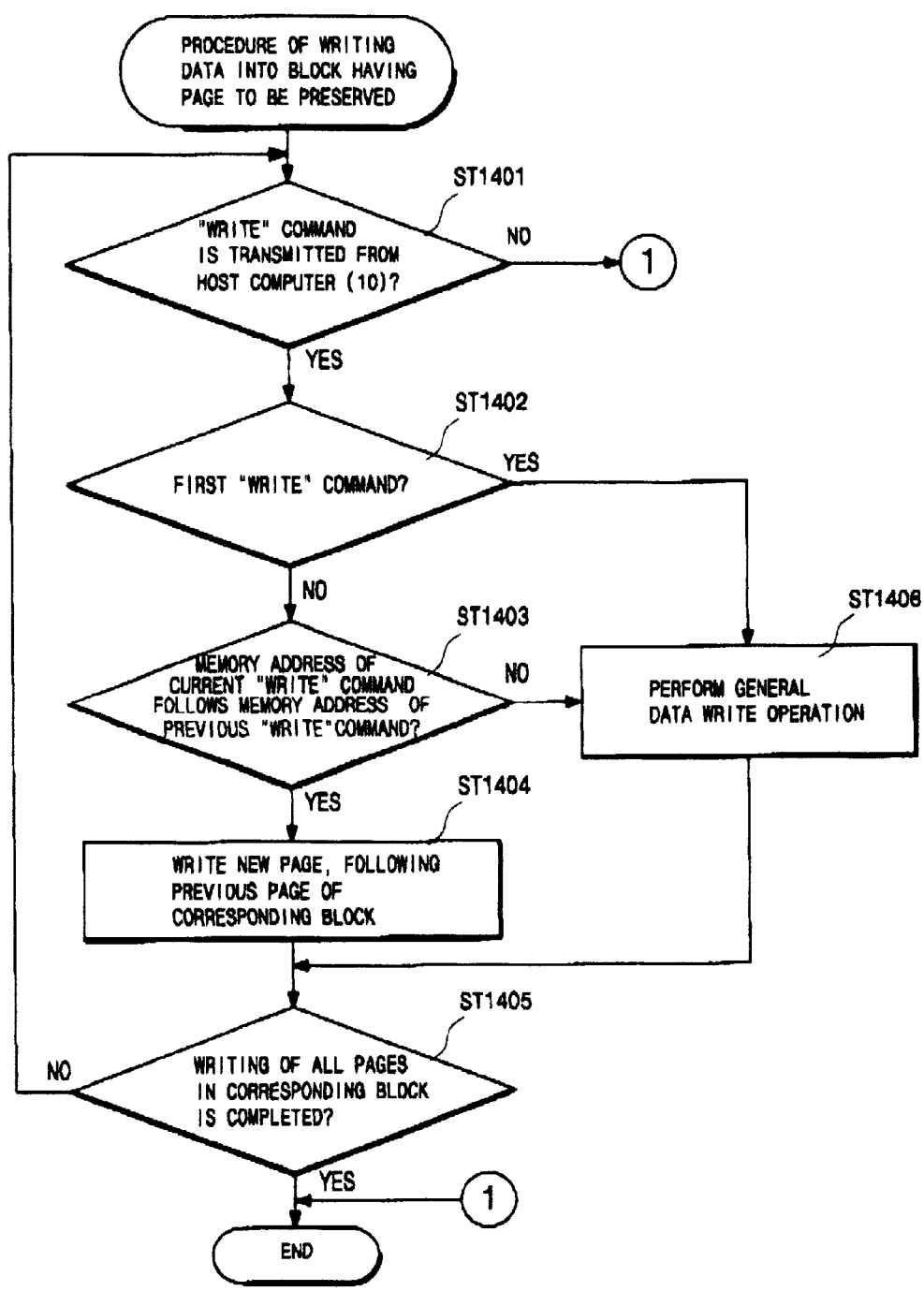

FIG. 14 is a flow chart for explaining a method of controlling the writing of the USB flash drive 100 according to an embodiment of the invention, for improving the data writing speed of a memory block where a page to be preserved exits.

In case where the command of "writing" data into a memory block in which a page to be preserved exits is transmitted from the host computer 10 to the USB flash drive 100, the controller 120 of the USB flash drive 100 counts the number of the "write" commands continuously applied to the USB flash drive (ST1401 and ST1402). Here, when it is confirmed that the "write" command sent from the host computer 10 is the one received after at least two commands arrived, the controller 120 of the USB flash drive 100 checks if the memory address based on the current "write" command follows the memory address depending on the "write" command right before the current "write" command (ST1403).

When it is confirmed that the memory addresses continue in the step ST1403, the controller 120 of the USB flash drive 100 write a new page written according to the current "write" command, following the previous page of the corresponding memory block (ST1404). The steps ST1401 to ST1404 are repeated until writing of all pages in the corresponding block is completed (ST1405).

Meantime, in case where the current "write" command is the first "write" command in the step ST1402, or the memory address of the current "write" command does not follow the memory address of the previous "write" command in the ST1403, the USB flash drive 100 performs the general data "write" operation described in FIG. 3 (ST1406).

According to the aforementioned embodiment, the device descriptor information and interface descriptor information of the USB flash drive are automatically transmitted to the host computer according to the USB standard and UFI protocol, and the host computer loads the UFI driver based on the received descriptor information to easily recognize the USB flash drive and prepare the operation thereof. Accordingly, its user can conveniently use the USB flash drive without installing an additional client program provided by the manufacturer of the USB flash drive.

Furthermore, in case where two or more "write" commands are continuously transmitted for the same memory block of the flash memory, the data preservation procedure that is repeatedly performed for the "write" commands following the previous two commands of the corresponding memory block is omitted to improve the speed of writing data into the flash memory.

Moreover, the USB flash drive does not require a decoder for outputting the chip select signal of the flash memory to easily increase the number of flash memories installed and reduce the production cost of the USB flash drive. In addition, the flash memory can be low-level-formatted by simple switching operation when FAT information of the flash memory is damaged so that even a user who is not experienced in handling the computer can cope with a problematical situation.

As described above, the present invention provides the USB-based portable storage medium and a control method therefor, which is easily recognized and driven by the host computer using USB and UFI method without installing an additional driver, improve the speed of "writing" data into the inner flash memory, and easily increase the number of flash memories installed.

What is claimed is:

1. A portable storage medium, based on USB standard, connected to a USB port of a host computer applying UFI protocol, comprising:
   a USB connector through which the storage medium is physically connected to the USB port of the host computer;
   at least one nonvolatile flash memory for storing data transmitted from the host computer;
   a program storage for storing a predetermined operation program based on USB and UFI; and
   a controller for controlling the entire operation of the storage medium based on the predetermined operation program stored in the program storage,
   wherein the predetermined operation program of the program storage includes a memory processing block for checking and updating header block information of the flash memory, a device recognition processing block for transmitting device descriptor information and interface descriptor information for loading a UFI driver to the host computer, and a UFI processing block for generating predetermined UFI response packets by UFI commands sent from the host computer to transmit them to the host computer.

2. The portable storage medium as recited in claim 1, wherein the flash memory is a NAND type flash memory, and the storage medium includes a USB controller for transmitting and receiving data to and from the host computer based on USB standard, an SMC controller for controlling the operation of the flash memory using an SMC interface signal, and a microprocessor connected to the USB controller and SMC controller to control the operation of the USB controller and SMC controller based on the predetermined operation program of the program storage and a UFI command transmitted from the host computer.

3. The portable storage medium as recited in claim 2,
   wherein the SMC controller is connected to the flash memory through a data/address bus to transmit data read or written and address information of the data;
   wherein the program storage includes a memory driving block for selectively driving the flash memory based on memory address information contained in "write" and "read" commands transmitted from the host computer; and
   wherein the microprocessor is connected to the flash memory through a system bus to apply a chip select signal for driving the flash memory according to the operation routine of the memory driving block.

4. The portable storage medium as recited in claim 1, wherein the program storage further includes a write processing block, the write processing block directly writing data in pages into a current memory address, when at least two "write" commands are sequently transmitted from the host computer for the same memory block of the flash memory, and when the memory address of a first "write" command, transmitted after a second "write" command of a corresponding memory block, follows the memory address of an immediate previous "write" command.

5. The portable medium as recited in claim 1, further comprising:
  a toggle switch for operating a low-level-formatting operation when FAT information of the flash memory is damaged;
  wherein the program storage further includes a format processing block for deleting a block 0 of the flash memory when the number of times of switching operations of the toggle switch exceeds a predetermined number of times.

6. A method for controlling the recognition of a portable storage medium which is connected to a USB port of a host computer applying UFI protocol and USB standard, the method comprising the steps of:
  transmitting device descriptor information, containing a manufacturer ID, a product ID and a first class information for selecting a UFI method, to the host computer in response to a request of the device descriptor of the host computer;
  transmitting interface descriptor information, containing a second class information for selecting UFI protocol, to the host computer in response to a request of the interface descriptor of the host computer;
  loading a UFI driver of the host computer according to the selected UFI protocol; transmitting a UFI response packet, including predetermined device information and capacity information, to the host computer in response to a request of identifying device and capacity of the host computer; and
  sending FAT information stored in a flash memory to the host computer in response to a request of FAT information of the host computer.

7. A method for controlling data writing operation of a portable storage medium adapting USB standard, comprising:
  a first step of confirming if a "write" command is transmitted from a host computer to which the storage medium is connected;
  a second step of confirming if a transmitted "write" command is a first "write" command;
  a third step of confirming if the memory address of a current "write" command follows the memory address of a previous "write" command, when the transmitted "write" command is not the first "write" command; and
  a fourth step of writing a new page, after a previous page, when the memory address of a previous "write" command follows the memory address of a current "write" command,
  the first to fourth steps being performed in a memory block where pages into which data will be written and pages into which data was written exist concurrently.

8. The method as recited in claim 7, wherein a general writing method of NAND type flash memory is executed, if the transmitted "write" command is identified as the first "write" command in the second step.

9. The method as recited in claim 8, wherein the general writing method of the NAND type flash memory is executed, if it is confirmed that the memory address of the current "write" command does not follow the memory address of the previous "write" command in the third step.

10. The method as recited in claim 7, wherein the first to fourth steps are repeated until writing of all a pages in a corresponding block is completed.

* * * * *